United States Patent
Komiyama

(10) Patent No.: US 11,438,562 B2
(45) Date of Patent: Sep. 6, 2022

(54) DISPLAY APPARATUS AND CONTROL METHOD THEREOF

(71) Applicant: CANON KABUSHIKI KAISHA, Tokyo (JP)

(72) Inventor: Tomoaki Komiyama, Kamakura (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 310 days.

(21) Appl. No.: 16/850,569

(22) Filed: Apr. 16, 2020

(65) Prior Publication Data

US 2020/0344454 A1  Oct. 29, 2020

(30) Foreign Application Priority Data

Apr. 26, 2019 (JP) .............................. JP2019-085796

(51) Int. Cl.
*H04N 5/21* (2006.01)
*H04N 9/31* (2006.01)
*G09G 3/20* (2006.01)

(52) U.S. Cl.
CPC ............ *H04N 9/3188* (2013.01); *G09G 3/20* (2013.01); *H04N 5/21* (2013.01); *G09G 2340/0435* (2013.01); *G09G 2340/0442* (2013.01); *G09G 2370/12* (2013.01)

(58) Field of Classification Search
CPC .......... H04N 5/21; H04N 9/3188; G09G 3/20; G09G 2340/0435; G09G 2340/0442; G09G 2370/12

See application file for complete search history.

(56) References Cited

U.S. PATENT DOCUMENTS

| | | | | |
|---|---|---|---|---|
| 8,692,892 B2 * | 4/2014 | Kimoto | .............. | H04N 1/00283 348/207.11 |
| 8,938,155 B2 * | 1/2015 | Ishimaru | .............. | H04N 21/426 386/248 |
| 2004/0017481 A1 * | 1/2004 | Takasumi | ............... | H04N 5/772 348/207.99 |
| 2005/0024534 A1 | 2/2005 | Honda et al. | | |

(Continued)

FOREIGN PATENT DOCUMENTS

| CN | 103931170 A | 7/2014 |
|---|---|---|
| EP | 2814023 A1 | 12/2014 |
| JP | 2006140627 A | 6/2006 |

OTHER PUBLICATIONS

Combined Search and Examination Report issued by the Intellectual Property Office of Great Britain dated Jan. 29, 2021 in corresponding GB Patent Application No. 2005626.3.

(Continued)

*Primary Examiner* — Brian P Yenke
(74) *Attorney, Agent, or Firm* — Carter, DeLuca & Farrell LLP

(57) ABSTRACT

A display apparatus receives an image signal, executes a muting process on the image signal depending on a fluctuation in a framerate of the image signal, acquires information attached to the image signal, and determines whether or not the framerate of the image signal is fluctuating based on the information, and execute the muting process, or not execute the muting process, depending on the determination result. The display apparatus does not execute the muting process when the framerate of the image signal is determined to be fluctuating.

20 Claims, 10 Drawing Sheets

(56) References Cited

U.S. PATENT DOCUMENTS

| | | | |
|---|---|---|---|
| 2005/0265627 A1 | 12/2005 | Yamauchi | |
| 2010/0109974 A1* | 5/2010 | Dunn | H04N 21/4334 345/3.1 |
| 2012/0257105 A1* | 10/2012 | Kimoto | G09G 5/006 348/E7.003 |
| 2012/0327072 A1* | 12/2012 | Jeon | H04N 13/341 345/419 |
| 2013/0257905 A1* | 10/2013 | Kemmochi | G06T 11/60 345/632 |
| 2013/0336631 A1* | 12/2013 | Kura | H04N 13/30 386/230 |
| 2015/0131001 A1* | 5/2015 | Cho | H04L 69/08 348/445 |
| 2015/0264298 A1* | 9/2015 | Colenbrander | G06F 3/14 345/547 |
| 2015/0365625 A1* | 12/2015 | Ishizaki | G06F 3/1423 348/581 |
| 2016/0065794 A1 | 3/2016 | Baqai et al. | |
| 2020/0082781 A1* | 3/2020 | An | G09G 5/003 |

OTHER PUBLICATIONS

CN Office Action issued by the CN Patent Office dated Jun. 17, 2022 in corresponding CN Patent Application No. 202010293310.2.

* cited by examiner

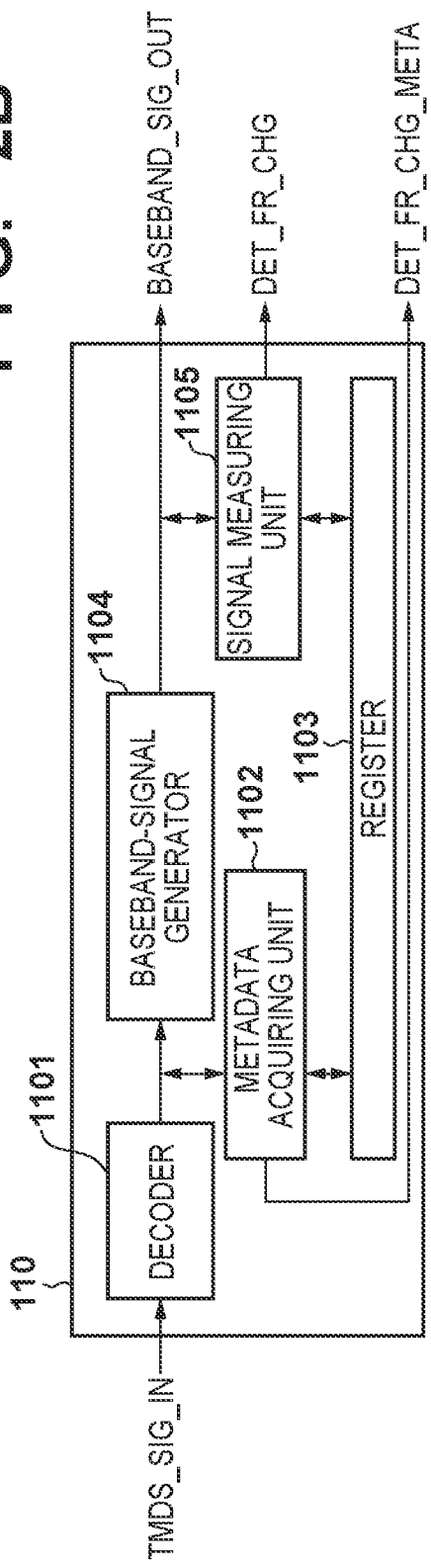
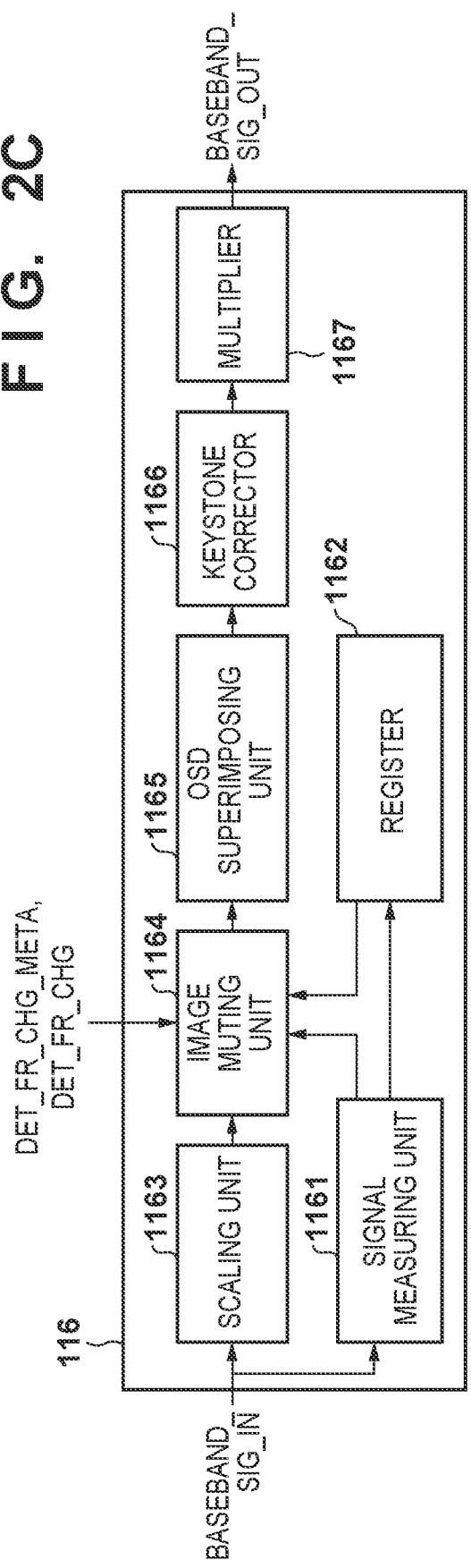

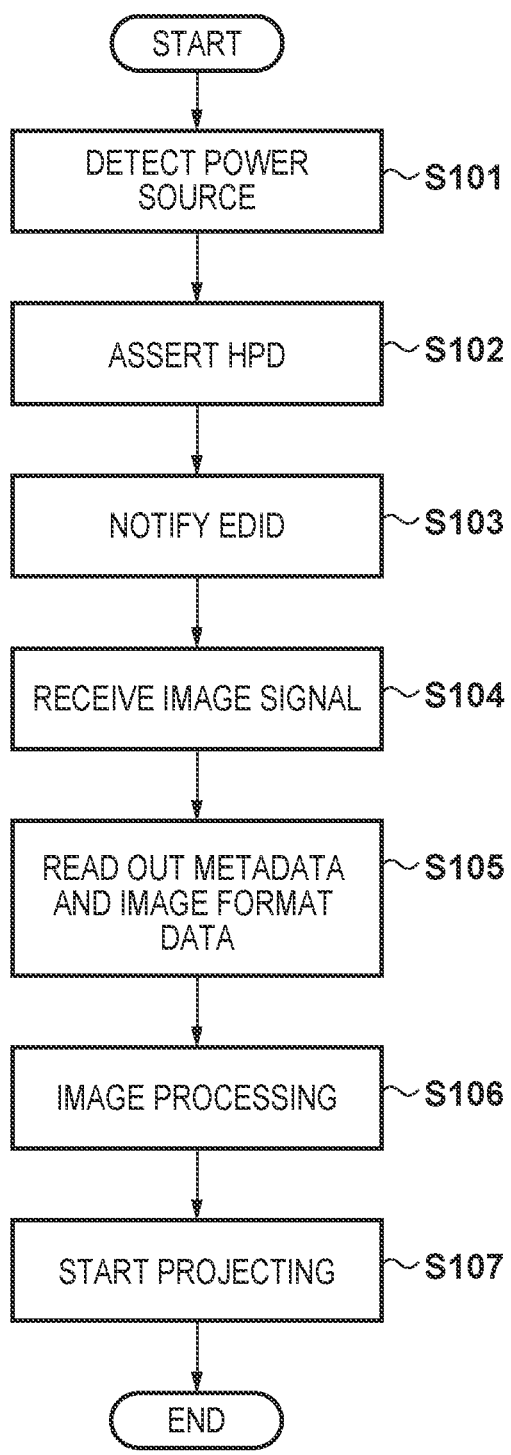
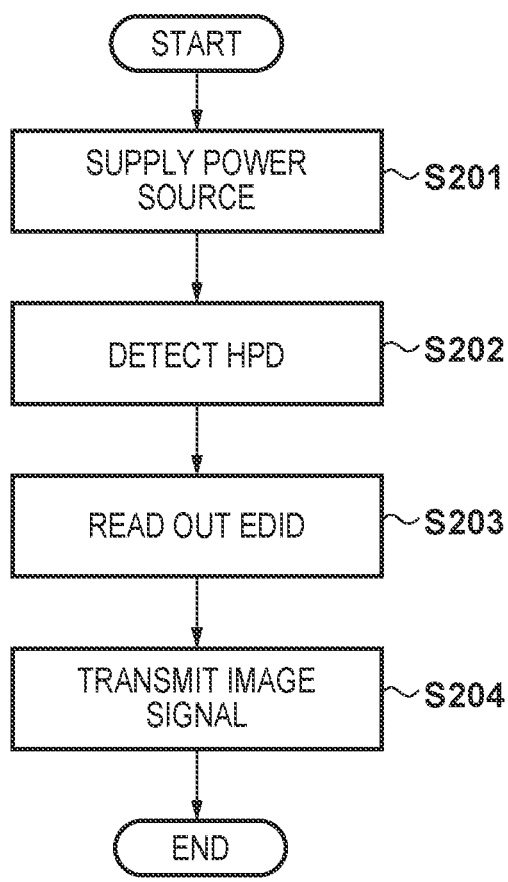

DISPLAY APPARATUS AND CONTROL METHOD THEREOF

BACKGROUND OF THE INVENTION

Field of the Invention

The present invention relates to a display control technology of images.

Description of the Related Art

In a system for outputting an image from an output apparatus, such as a personal computer (PC), to a display apparatus, such as a television set, a monitor, or a projector, and displaying the image, when the framerate of an image signal output from the output apparatus is changed, image mute control in which mute images, which are images changed to a fixed color such as black, are inserted between frames is performed so as to prevent displaying an image distorted by the fluctuation in the framerate. Japanese Patent Laid-Open No. 2006-140627 describes a display apparatus in which a fluctuation in the frequencies of a vertical synchronization signal and a horizontal synchronization signal of an image is detected and image mute control is performed.

Recent output apparatuses include those that are able to dynamically vary the framerate of an image signal output to a display apparatus and seamlessly display an image without inserting mute images at the display apparatus. However, when the display apparatus detects a fluctuation in the framerate of the image signal output from the output apparatus and performs image mute control, an image that was to be displayed without distortion may be blacked out.

SUMMARY OF THE INVENTION

The present invention has been made in consideration of the aforementioned problems, and realizes techniques that can appropriately execute image mute control when the framerate of an image signal is variably output.

In order to solve the aforementioned problems, the present invention provides a display apparatus comprising: a memory and at least one processor and/or at least one circuit which function as: a receiving unit configured to receive an image signal; an image muting unit configured to execute a muting process on the image signal depending on a fluctuation in a framerate of the image signal; an acquiring unit configured to acquire information attached to the image signal; and a switching unit configured to determine whether or not the framerate of the image signal is fluctuating based on the information, and activate the image muting unit to execute the muting process, or deactivate the image muting unit from executing the muting process, depending on the determination result, wherein the switching unit deactivates the image muting unit when the framerate of the image signal is determined to be fluctuating.

In order to solve the aforementioned problems, the present invention provides a display apparatus which displays an image based on an image signal, comprising: a memory and at least one processor and/or at least one circuit which function as: a receiving unit configured to receive the image signal; an image muting unit configured to execute a muting process on the image signal depending on a fluctuation in a framerate of the image signal; a holding unit configured to hold information indicating image display capability of the display apparatus in a rewritable manner; and a switching unit configured to activate the image muting unit to execute the muting process, or deactivate the image muting unit from executing the muting process, wherein the switching unit deactivates the image muting unit when the information indicates that the display apparatus has image display capability corresponding to the fluctuation of the framerate of the image signal.

In order to solve the aforementioned problems, the present invention provides a method of controlling a display apparatus which has a receiving unit configured to receive an image signal and an image muting unit configured to execute a muting process on the image signal depending on a fluctuation in a framerate of the image signal, the method comprising: receiving the image signal; acquiring information attached to the image signal; determining whether or not the framerate of the image signal is fluctuating based on the acquired information; and deactivating the image muting unit from executing the muting process when the framerate of the image signal is determined to be fluctuating.

In order to solve the aforementioned problems, the present invention provides a method of controlling a display apparatus configured to display an image based on an image signal, the display apparatus having a receiving unit configured to receive the image signal and an image muting unit configured to execute a muting process on the image signal depending on a fluctuation in a framerate of the image signal, the image muting unit being activated to execute the muting process, or deactivated from executing the muting process, depending on whether or not the display apparatus has image display capability corresponding to the fluctuation in the framerate of the image signal, the method comprising: receiving the image signal; holding information indicating image display capability of the display apparatus in a rewritable manner; and deactivating the image muting unit when the held information indicates that the display apparatus has image display capability corresponding to the fluctuation in the framerate of the image signal.

In order to solve the aforementioned problems, the present invention provides a non-transitory computer-readable storage medium storing a program that causes a computer to execute a method of controlling a display apparatus which has a receiving unit configured to receive an image signal and an image muting unit configured to execute a muting process on the image signal depending on a fluctuation in a framerate of the image signal, the method comprising: receiving the image signal; acquiring information attached to the image signal; determining whether or not the framerate of the image signal is fluctuating based on the acquired information; and deactivating the image muting unit from executing the muting process when the framerate of the image signal is determined to be fluctuating.

In order to solve the aforementioned problems, the present invention provides a non-transitory computer-readable storage medium storing a program that causes a computer to execute a method of controlling a display apparatus configured to display an image based on an image signal, the display apparatus having a receiving unit configured to receive the image signal and an image muting unit configured to execute a muting process on the image signal depending on a fluctuation in a framerate of the image signal, the image muting unit being activated to execute the muting process, or deactivated from executing the muting process, depending on whether or not the display apparatus has image display capability corresponding to the fluctuation in the framerate of the image signal, the method comprising: receiving the image signal; holding information indicating image display capability of the display apparatus in a rewritable manner; and deactivating the image muting unit when the held information indicates that the display apparatus has image display capability corresponding to the fluctuation in the framerate of the image signal.

According to the present invention, image mute control can be appropriately executed when the framerate of an image signal is variably output.

Further features of the present invention will become apparent from the following description of exemplary embodiments (with reference to the attached drawings).

BRIEF DESCRIPTION OF THE DRAWINGS

FIG. 2B is a block diagram illustrating the configuration of an image input unit.

FIG. 2C is a block diagram illustrating the configuration of an image processor.

FIG. 4A is a flowchart illustrating image display processing by the projector.

FIG. 4B is a flowchart illustrating image output processing by the PC.

DESCRIPTION OF THE EMBODIMENTS

Figure 1:
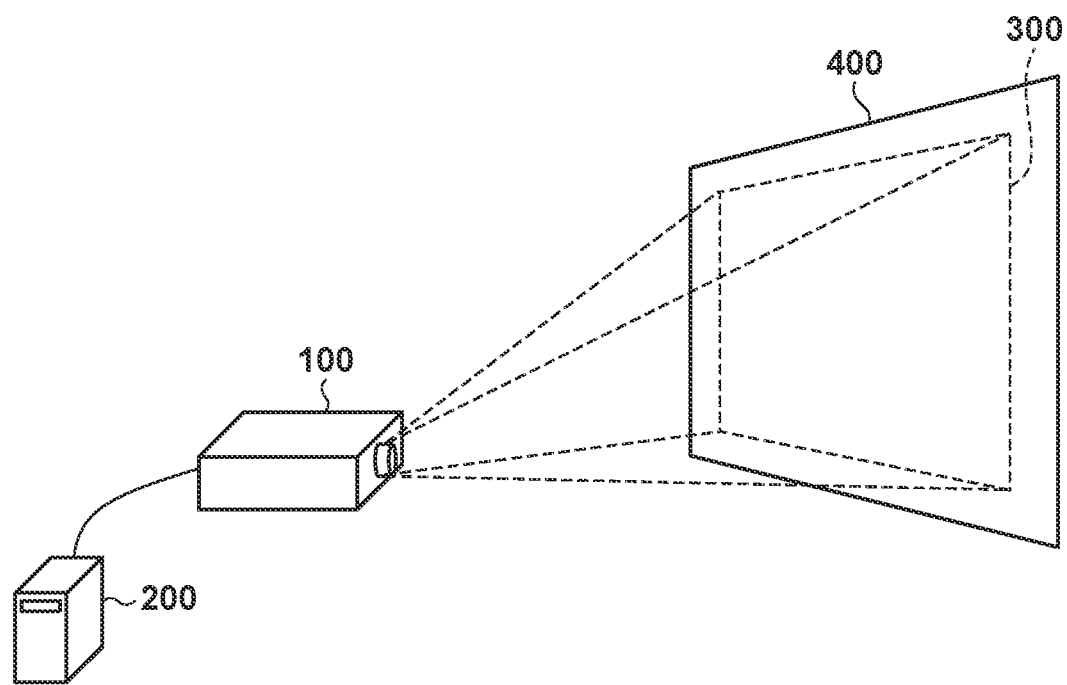
FIG. 1 is a diagram illustrating a system in which a projector and a PC are connected.

Hereinafter, embodiments will be described in detail with reference to the attached drawings. Note, the following embodiments are not intended to limit the scope of the claimed invention. Multiple features are described in the embodiments, but limitation is not made an invention that requires all such features, and multiple such features may be combined as appropriate. Furthermore, in the attached drawings, the same reference numerals are given to the same or similar configurations, and redundant description thereof is omitted.

First Embodiment

In this embodiment, an example in which a projector and a PC are used as a display apparatus and an output apparatus, respectively, will be described.

FIG. 1 illustrates an example in which a projector 100 and a PC 200 are connected to each other, an image signal output from the PC 200 is received by the projector 100, and the projector 100 displays a projection image 300 on a screen 400. The projector 100 according to this embodiment controls the light transmittance of a liquid crystal element in accordance with the image to be displayed on a projection surface, and projects the light from a light source transmitted through the liquid crystal element onto the screen 400, so as to present an image to a user.

Configuration of Projector 100

Figure 2A:
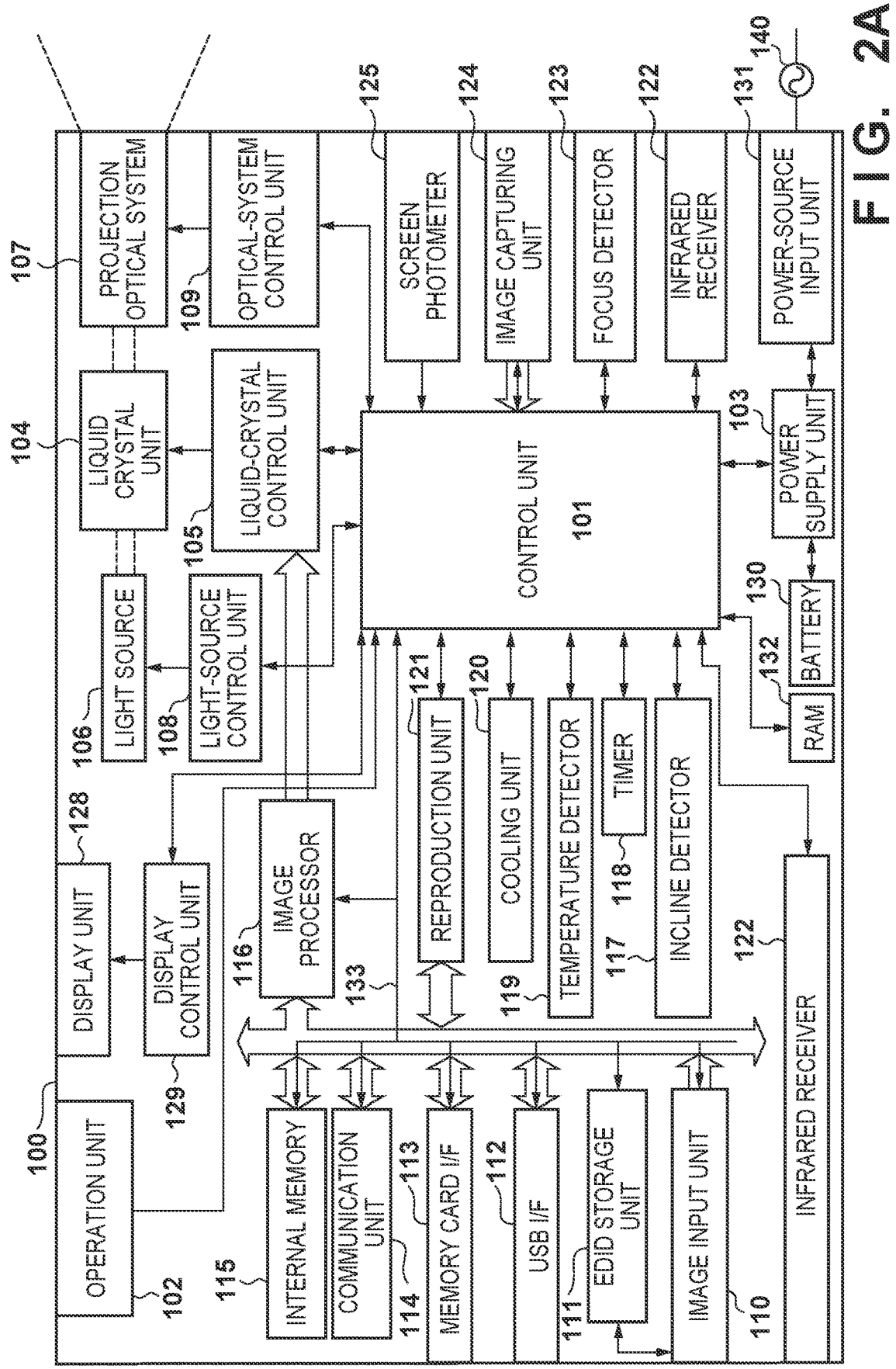
FIG. 2A is a block diagram illustrating the configuration of the projector.

First, the configuration and function of the projector 100 will be described with reference to FIG. 2A.

A control unit 101 includes a microcomputer including a CPU, an I/O circuit, an internal register, etc., and controls the respective blocks of the projector 100. The control unit 101 is connected to each block via a bus 133, and can exchange various signals and data with each block.

An operation unit 102 includes, for example, switches, dials, and a touch panel provided on a display unit 128 described below, and accepts user operations and transmits an operation signal to the control unit 101. Moreover, the operation unit 102 may include a signal receiver (for example, an infrared receiver 122 described below) that receives an operation signal transmitted from, for example, a remote controller (not illustrated), and output the received operation signal to the control unit 101. Furthermore, the control unit 101 receives operation signals input via the operation unit 102 and a USB interface 112 described below and control signals input from a communication unit 114, so as to control each operating block of the projector 100.

A power supply unit 103 controls the supply of power to each block of the projector 100.

A liquid crystal unit 104 includes one liquid crystal panel, three liquid crystal panels, or the like, and forms images on the liquid crystal panels.

A liquid-crystal control unit 105 controls, based on an input image signal, the voltage to be applied to each pixel of the liquid crystal panels of the liquid crystal unit 104 so as to adjust the transmittance of light, and forms an image on the liquid crystal panel. A light source 106 outputs light to the liquid crystal unit 104, and is, for example, a halogen lamp, a xenon lamp, a high-pressure mercury lamp, an LED light source, a laser diode, or a type of light source that uses a phosphor or the like to excite light emitted from a laser diode so as to convert the light wavelength.

A projection optical system 107 projects, onto the screen 400, an image formed on the liquid crystal panel of the liquid crystal unit 104. The projection optical system 107 includes a plurality of lenses and actuators for driving the lenses. By driving the lenses using the actuators, enlargement, reduction, shift, focus adjustment, etc., of the projection image can be performed.

A light-source control unit 108 controls the on/off and the light intensity of the light source 106.

An optical-system control unit 109 performs zooming, focus adjustment, and the like by controlling the actuators of the projection optical system 107.

An image input unit 110 receives a digital image signal from an external device, such as the PC 200. The image input unit 110 is, for example, an HDMI (trademark), and can receive image signals, audio signals, and other metadata according to protocol complying with the HDMI (trademark). Moreover, when an analog image signal is received, the image input unit 110 converts the received analog image signal to a digital image signal and transmits the digital image signal to an image processor 116. That is, the image input unit 110 has a function of converting an analog image signal to a signal receivable by the image processor 116 described below, and further has a function of acquiring metadata superimposed (attached) on an image signal, a function of measuring the framerate (signal timing) of an image signal, and the like. The external device is not limited to the PC 200, and may be a camera, a mobile phone, a smart phone, a hard disk recorder, a game console, or the like, as long as it can output an image signal.

An EDID storage unit 111 is a non-volatile memory that stores Extended Display Identification Data (EDID) indicating the image display capability of the projector 100, and has an upper limit on the number of times it can be rewritten from the viewpoint of durability. The basic operations of an external device connected via the image input unit 110 of the projector 100 are reading out information stored in the EDID storage unit 111 and outputting an image based on the read information.

A universal serial bus (USB) interface 112 is an interface that accesses a memory device, which is a USB device, to read out images, audio, and other data, and controls writing. Moreover, the USB interface 112 is an interface that accepts an operation signal input via a pointing device or a keyboard, which is a USB device.

A memory card interface 113 accesses a storage medium, such as a memory card, reads out images, audio, and other data, and controls writing. A memory card is a memory device, such as an SD card or a CompactFlash (trademark).

A communication unit 114 can receive control signals and image data from an external device. The communication unit 114 may be, for example, a wireless LAN, a wired LAN, a USB, Bluetooth (trademark), or the like, and the communication method is not particularly limited. Furthermore, in the case where the image input unit 110 is, for example, an HDMI (trademark), the image input unit 110 may establish CEC communication via the HDMI (trademark) terminal. Here, the external device is not limited to the PC 200, and may be a camera, a mobile phone, a smart phone, a hard disk recorder, a game console, a remote controller, or the like, as long as the external device is able to communicate with the projector 100.

An internal memory 115 is a non-volatile semiconductor memory, a hard disk, or the like that stores images, audio, and other data.

The image processor 116 performs, on an image signal received from the image input unit 110 and an image signal decoded by a reproduction unit 121 described below, processing for modifying the frame number, the pixel number, the image shape, etc., and processing for superimposing an on-screen display (OSD), and outputs processed signals to the liquid-crystal control unit 105. The image processor 116, for example, converts the pixel number of an image signal according to the pixel number of the liquid crystal panel, and multiplies the framerate of the input image signal and performs correction appropriate for image formation performed by the liquid crystal panel, which is AC driven. Note that AC driving of the liquid crystal panel refers to a method of alternating the direction of the voltage to be applied to the pixels of the liquid crystal panel and displaying an image by using the property of the liquid crystal panel that an image can be generated when a voltage is applied in either the forward or the reverse direction. In such a case, the liquid-crystal control unit 105 needs to transmit one of each of a forward direction image and a reverse direction image, and thus, the image processor 116 performs a process to speed up the framerate of the image signal. Note that the liquid crystal unit 104 may be driven by the liquid-crystal control unit 105 according to any method that corresponds with the applied voltage, such as a drive method using an analog signal, a drive method using a digital signal according to pulse width modulation (PWM), or the like. Furthermore, in the case where a liquid crystal panel driven according to digital signals is used, a technique for reducing image quality degradation, such as disclination caused by the driving method is used. Therefore, even when the liquid crystal panel is driven according to a digital signal, the framerate may be multiplied.

Furthermore, the image processor 116 is able to measure the image signal input from the image input unit 110.

The image signal input from the image input unit 110 includes a synchronization signal and an image signal. The signal timing of each signal is measured and held in an internal register or the like that can be read by the control unit 101.

Furthermore, the image processor 116 also performs keystone correction when an image is projected onto the screen 400 at an oblique angle and the projection image is distorted, for example, into a trapezoidal shape, so as to modify the shape of the projection image so that the trapezoidal distortion is cancelled out. When keystone correction is performed, the enlargement/reduction ratio of the image displayed on the liquid crystal panel is changed in the horizontal and/or vertical direction. In this way, the trapezoidal distortion of the projection image and the distortion in the image region on the liquid crystal panel are cancelled out, and an image having an aspect ratio similar to that of a rectangular display region is displayed on the screen 400. The keystone correction may operate automatically or may be operated in response to an operation made by the user on the operation unit 102, based on the incline angle acquired by an incline detector 117 described below.

The incline detector 117 detects the incline of the projector 100.

A timer 118 measures the operating time of the projector 100, the operating time of each block, and the like.

A temperature detector 119 measures the temperature of the light source 106 of the projector, the temperature of the liquid crystal unit 104, the ambient temperature, and the like.

A cooling unit 120 includes a heat sink, a fan, and the like for cooling by discharging the internal heat of the projector 100 to the outside.

The reproduction unit 121 decodes an encoded file or the like under the control of the control unit 101 and outputs the decoded file to the image processor 116.

An infrared receiver 122 receives infrared light from a remote controller provided for the projector 100 or other devices, and outputs an operation signal to the control unit 101. A plurality of infrared receivers 122 may be disposed at a plurality of positions, such as the front face and the rear face of the projector 100.

A focus detector 123 detects the distance between the projector 100 and the screen 400 and detects the focal length of an image.

An image capturing unit 124 captures an image of the image projected via the projection optical system 107 (in the direction of the screen 400) and outputs the captured image to the control unit 101. The image capturing unit 124 includes a lens group including a zoom lens and a focus lens for forming an optical image of a subject, an actuator that drives the lens group, and a microprocessor that controls the actuator. The image capturing unit 124 further includes an image capturing element, such as a CCD, a CMOS, or the like that converts the subject image formed by the lens group to an electric signal, an A/D converter that converts the analog signal acquired by the image capturing element to a digital signal, and the like.

A screen photometer 125 measures the intensity and luminance of the light reflected off the screen 400.

A display unit 128 is a display device formed of liquid crystal, organic EL, or the like, and is disposed in the projector 100 and displays the operating state of the projector 100, a UI screen, warnings, etc.

A display control unit 129 controls the display unit 128 under the control of the control unit 101.

A battery 130 supplies electrical power when the projector 100 is used at a location where a power outlet or the like is not provided.

A power input unit 131 accepts AC power from an external power source 140, such as an AC 100V source, rectifies the power to a predetermined voltage, and supplies the rectified power to the power supply unit 103.

A RAM 132 is used for loading programs stored in the internal memory 115 and for temporarily storing various data items and frame data of projection images. Here, the term "programs" refers to programs for executing various flowcharts as described below.

The bus 133 connects the control unit 101 and each block and exchanges various signals and data with each block.

Configuration of PC 200

Figure 3:
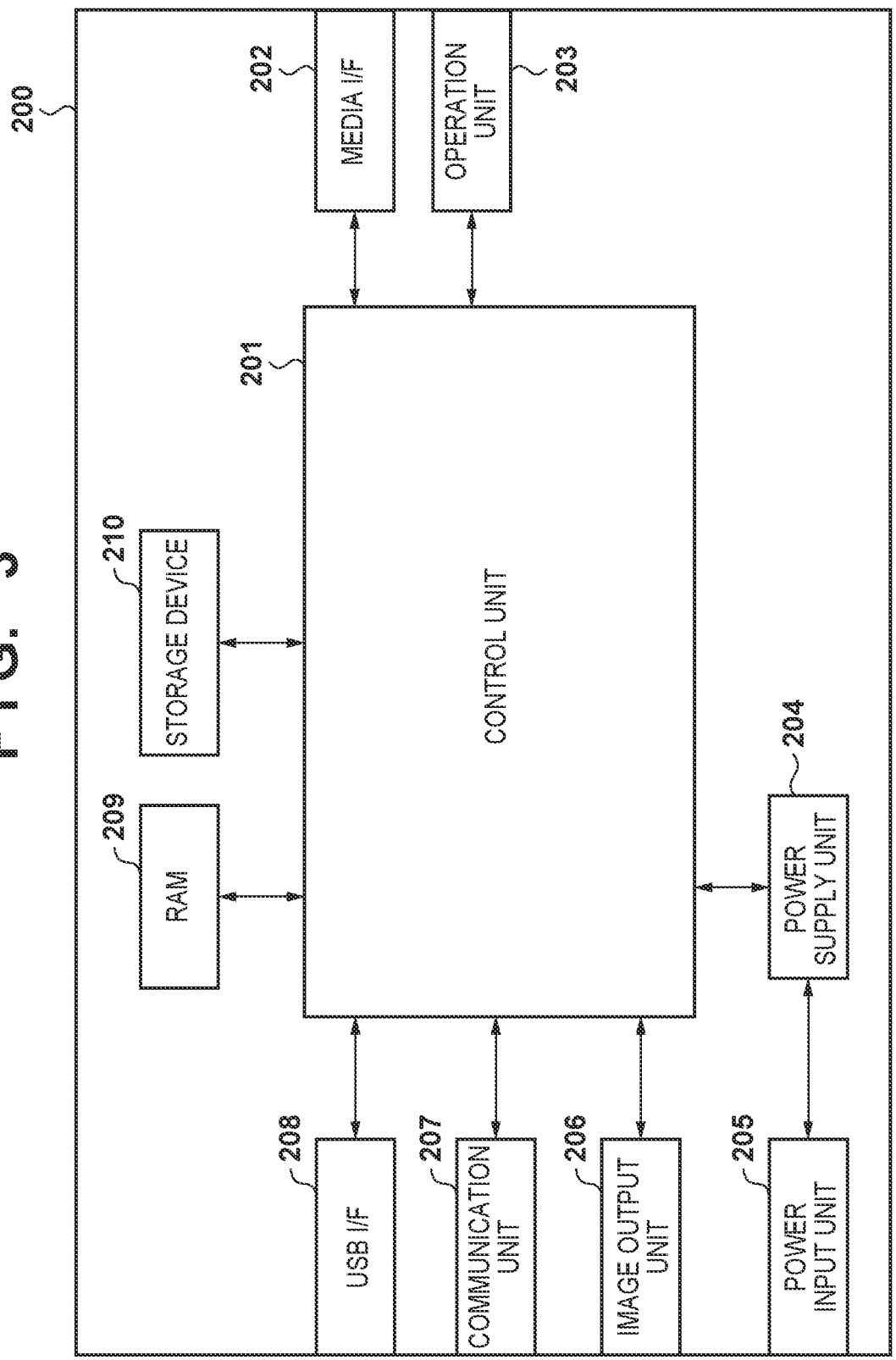
FIG. 3 is a block diagram illustrating the configuration of a PC.

Next, the configuration and function of the PC 200 will be described with reference to FIG. 3.

A control unit 201 includes a microcomputer including a CPU, an I/O circuit, an internal register, etc., and controls each block of the PC 200. The control unit 201 is connected to each block via a bus (not illustrated) and can exchange various signals and data with each block.

A media interface 202 is an interface that controls the reading and writing of images, audio, and other data from and to an optical disc, such as a DVD.

An operation unit 203 includes, for example, a switch, a dial, a touch panel provided on a display unit (not illustrated), and the like, accepts user operations, and transmits an operation signal to the control unit 201. The control unit 201 receives operation signals input from the operation unit 203 and a USB interface 208 described below and a control signal input from a communication unit 207, and controls each block of the PC 200.

A power supply unit 204 controls the power supply to each block of the PC 200. A power input unit 205 accepts AC power from an external device, rectifies the power to a predetermined voltage, and supplies the rectified power to the power supply unit 204.

An image output unit 206 transmits a digital image signal to an external device, such as the projector 100. The image output unit 206 is, for example, an HDMI (trademark), and can transmit image signals, audio signals, and other metadata according to protocol complying with the HDMI (trademark). The external device is not limited to the projector 100, and may be a recording device, a hard disk, a game console, or the like.

A communication unit 207 is able to transmit and receive various signals and data to and from an external device. The communication unit 207 is, for example, a wireless LAN, a wired LAN, a USB, Bluetooth (trademark), and the like. However, the communication method of the communication unit 207 is not particularly limited. Furthermore, in the case where the image output unit 206 is, for example, an HDMI (trademark), the image output unit 206 may establish CEC communication via the HDMI (trademark) terminal. Here, the external device is not limited to the projector 100 and may be a camera, a mobile phone, a smart phone, which is a type of mobile phone, a tablet, a recording device, a game console, a remote controller, or the like, as long as the device is able to communicate with the PC 200.

The USB interface 208 is an interface that accesses a memory device, which is a USB device, and controls the reading and writing of images, audio, and other data. Moreover, the USB interface 208 accepts operation signals input via a pointing device and a keyboard, which are USB devices.

A RAM 209 is used for loading programs stored in a storage device 210 described below and for temporarily storing various data items and image frame data. Here, the term "programs" refers to programs for executing various flowcharts as described below.

The storage device 210 is a non-volatile semiconductor memory, a hard disc, or the like, and stores an operating system (OS), programs, various data items, such as content including text data and image data.

Description of Operation

Next, a process by which the projector 100 connected to the PC 200 receives and displays an image signal will be described with reference to FIGS. 4A and 4B.

FIG. 4A illustrates processing performed by the projector 100, and FIG. 4B illustrates processing performed by the PC 200. Note that the processing in FIG. 4A is realized by the control unit 101 executing a program stored in the internal memory 115 and controlling each block. Furthermore, the processing in FIG. 4B is realized by the control unit 201 executing a program stored in the storage device 210 and controlling each block. Moreover, the processing in FIG. 4B starts when a user activates an application through a menu screen or the like of the PC 200. Moreover, the processing in FIG. 4A starts when an instruction from a user for starting image display processing by the projector 100 is accepted via a remote controller (not illustrated) or the operation unit 102.

Note that, in this embodiment, the projector 100 and the PC 200 are connected to each other by an HDMI cable; an image signal is output from the PC 200 according to protocol complying with the HDMI; and the image is displayed by the projector 100.

First, the operations of the projector 100 in FIG. 4A will now be described.

When the projector 100 is connected to the PC 200 using an HDMI cable, the image input unit 110 of the projector 100 detects that a 5-V power source has been output from the PC 200 via a 5-V power line of the HDMI cable, in step S101.

In step S102, the image input unit 110 asserts Hot Plug Detect (HPD) via an HPD line of the HDMI cable.

In step S103, in response to receiving an EDID request from the PC 200 via a display data channel (DDC) line of the HDMI cable, the image input unit 110 notifies the PC 200 of the internally held EDID via the DDC line.

In step S104, the image input unit 110 receives an image signal transmitted from the PC 200, and performs decoding and conversion of the image signal, measurement of the signal timing, etc., to output the image signal to the image processor 116.

In step S105, the image input unit 110 reads out various metadata items, such as the format of the image signal, from the decoded signal, and writes these in the internal register.

In step S106, the image processor 116 composites the image signal with a predetermined layout, converts the resolution of the image signal to that suitable for the liquid crystal unit 104, and also performs gamma correction, correction of unevenness in luminance, and keystone correction on the image signal.

In step S107, the image signal corrected by the image processor 116 is formed into an image on the liquid crystal unit 104 by the liquid-crystal control unit 105, and is guided to the projection optical system 107 by light emitted from the light source 106. The projection optical system 107 starts projecting the image.

Next, the operations of the PC 200 will be described with reference to FIG. 4B.

In step S201, when the image output unit 206 is connected to the projector 100 using the HDMI cable, the image output unit 206 supplies a 5-V power source via the 5-V power line of the HDMI cable.

In step S202, the image output unit 206 detects that HPD has been asserted via the Hot Plug Detect (HPD) line in the HDMI cable. In step S203, the image output unit 206 requests the EDID via the DDC line and reads out the EDID.

In step S204, the image output unit 206 determines the format of the image signal to be output based on the content of the read EDID, and outputs the image signal.

As a result of the operations described above, an image is displayed on the projector 100.

Operations During Framerate Fluctuation

Next, the operations of the projector 100 when the framerate of the image signal output from the PC 200 fluctuates will be described.

First, the internal configuration of the image input unit 110 and the image processor 116 according to this embodiment will be described.

First, a detailed configuration of the image input unit 110 will be described with reference to FIG. 2B.

A decoder 1101 receives and decodes, for example, a transition-minimized differential signaling (TMDS) signal (TMDS_SIG_IN) transmitted according to protocol complying with HDMI, and outputs the decoded signal to the following block.

A metadata acquiring unit 1102 reads out metadata superimposed on the decoded signal at a predetermined position, the metadata being specified according to protocol complying with HDMI, and writes the metadata in a register 1103 described below. The metadata contains various information items indicating attributes of the image signal. For example, the metadata contains information related to resolution, multiple information items related to framerate, information indicating the color space and color depth of the image signal, the colorimetry method, and the type of output apparatus, vendor-specific information, information specified by various image standards, and the like.

When the metadata acquiring unit 1102 reads out the metadata and detects that the framerate is fluctuating by using at least one of the read information items, the metadata acquiring unit 1102 outputs a signal (DET_FR_CHG_META) indicating the fluctuation to the image processor 116.

The register 1103 holds the metadata and the measurement results of the various synchronization signals described below.

A baseband-signal generator 1104 converts the decoded signal output from the decoder 1101 to a signal (BASEBAND_SIG_OUT) processable by the following block. The signal BASEBAND_SIG_OUT includes R, G, and B data signals, a horizontal synchronization signal, a vertical synchronization signal, a synchronization signal of a pixel clock, and the like.

A signal measuring unit 1105 measures the various synchronization signals output from the baseband-signal generator 1104. The signal measuring unit 1105 counts the number of oscillations of a self-propelled oscillator (not illustrated) per cycle of the various synchronization signals, and outputs the count value to the register 1103. Moreover, when the signal measuring unit 1105 detects a fluctuation in the horizontal synchronization signal or the vertical synchronization signal, the signal measuring unit 1105 determines it to be a fluctuation in the framerate and outputs a fluctuation detection signal (DET_FR_CHG) to the image processor 116.

Next, a detailed configuration of the image processor 116 will be described with reference to FIG. 2C.

A signal measuring unit 1161, similar to the signal measuring unit 1105, measures various synchronization signals output from the baseband-signal generator 1104. The signal measuring unit 1161 performs measurement by counting the number of oscillations of a self-propelled oscillator (not illustrated) per cycle of the various synchronization signals, and outputs the measurement result to a register 1162. Moreover, to monitor the fluctuation amount of the framerate, the signal measuring unit 1161 holds the measurement values in an internal storage unit, and is able to hold the difference between each measurement and the measurement value of the previous measurement, for example, the measurement value taken during reception of an image signal of the last frame, as a fluctuation amount.

The register 1162 holds the measurement results of the various synchronization signals obtained by the signal measuring unit 1161. Moreover, by writing data in the register 1162 from the image processor 116, etc., the register 1162 has a function of outputting a switching signal for switching between activation and deactivation of automatic image muting processing (hereinafter, referred to as "image mute control") performed by an image muting unit 1164 described below. Note that, in this embodiment, the processing for clearing a displayed image and the processing for overwriting a displayed image with another image (mute image) are referred to as "muting processing".

A scaling unit 1163 performs, on an image signal (BASEBAND_SIG_IN) output from the image input unit 110, processing for enlarging or reducing the image.

When the image mute control is activated, the image muting unit 1164 generates a mute image and outputs the mute image to an OSD superimposing unit 1165, which is the following block thereof. The mute image is generated by changing the color of the image signal output from the scaling unit 1163, which is the preceding block, to a fixed color, such as black. Moreover, the image muting unit 1164 switches between activation and deactivation of the image mute control according to the switching signal output from the register 1162 depending on the measurement result of the signal measuring unit 1161. Note that the mute image may be a blue screen image or an image that requests the user to connect a cable, instead of an image in which the entire image signal is overwritten with black.

The OSD superimposing unit 1165 superimposes image data, such as an operation menu, preliminarily stored in the internal memory 115 as an OSD, on the image signal output from the image muting unit 1164, which is the preceding block thereof.

When the image muting unit 1164 is not deactivated (when activated), the image muting unit 1164 receives the fluctuation detection signal (DET_FR_CHG) output from the signal measuring unit 1105, detects a framerate fluctuation from the measurement result of the signal measuring unit 1161, and performs image mute control. The image muting unit 1164 is the following block of the scaling unit 1163, and performs image mute control before processing is performed by the OSD superimposing unit 1165.

A keystone corrector 1166 changes the shape of the image so as to cancel out trapezoidal distortion. A multiplier 1167 acquires a required frame rate by appropriately multiplying the framerate of the image signal, and outputs a signal (BASEBAND_SIG_OUT) to the following block.

Operations of PC 200

Next, operations for changing the framerate of an image output from the PC 200 will be described with reference to FIG. 5.

Figure 5:
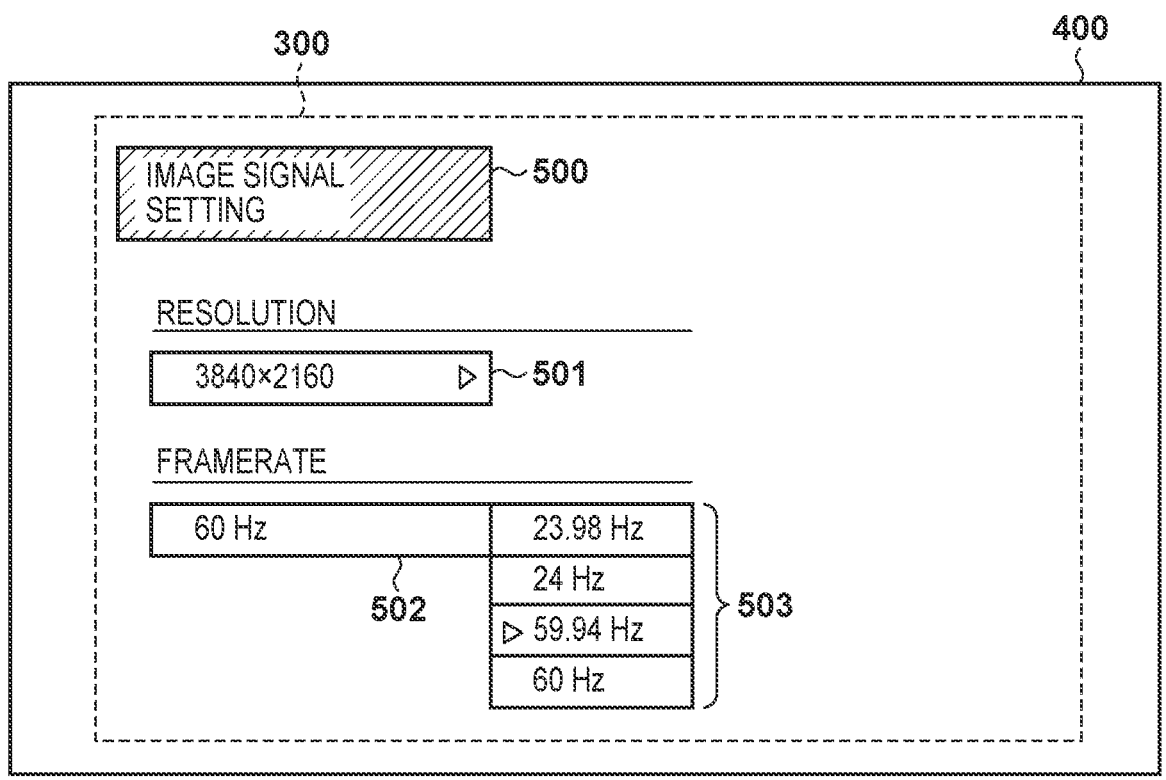
FIG. 5 is a diagram illustrating example OSDs for setting an image signal to be output to the projector.

FIG. 5 illustrates OSDs superimposed on the projection image 300 for setting an image signal output from the PC 200. An OSD 500 is an item for setting the image signal. An OSD 501 is an item for setting the resolution of the image signal. An OSD 502 is an item for displaying the currently set framerate of the image signal. OSDs 503 are multiple items for changing the setting of the framerate.

A user can operate the OSD 500 to change the framerate of the image signal output from the PC 200 to the projector 100. The PC 200 outputs an image signal for which the signal timing has been changed, based on the framerate of which the setting has been changed.

Next, the operations of the projector 100 for when the framerate of the image signal output from the PC 200 fluctuates will be described with reference to FIG. 6. The processing in FIG. 6 indicates the operations for when the framerate of the image signal output from the PC 200 is changed via the OSD 500 in FIG. 5.

When the framerate of the image signal output from the PC 200 is changed according to a user operation via the OSD 500, the control unit 201 instructs the image output unit 206 to transmit the image signal based on the changed framerate. The image output unit 206 changes the framerate to the designated framerate based on the instruction from the control unit 201. At the same time, the image output unit 206 changes the metadata related to the framerate to indicate appropriate data, superimposes the metadata on the image signal, and transmits the image signal to the projector 100. Furthermore, when the PC 200 changes the signal timing of the image signal over several frames so as to achieve a desired framerate, the PC 200 changes the metadata related to the framerate during this time to indicate appropriate data, superimposes the metadata on the image signal, and transmits the image signal to the projector 100.

Figure 6:
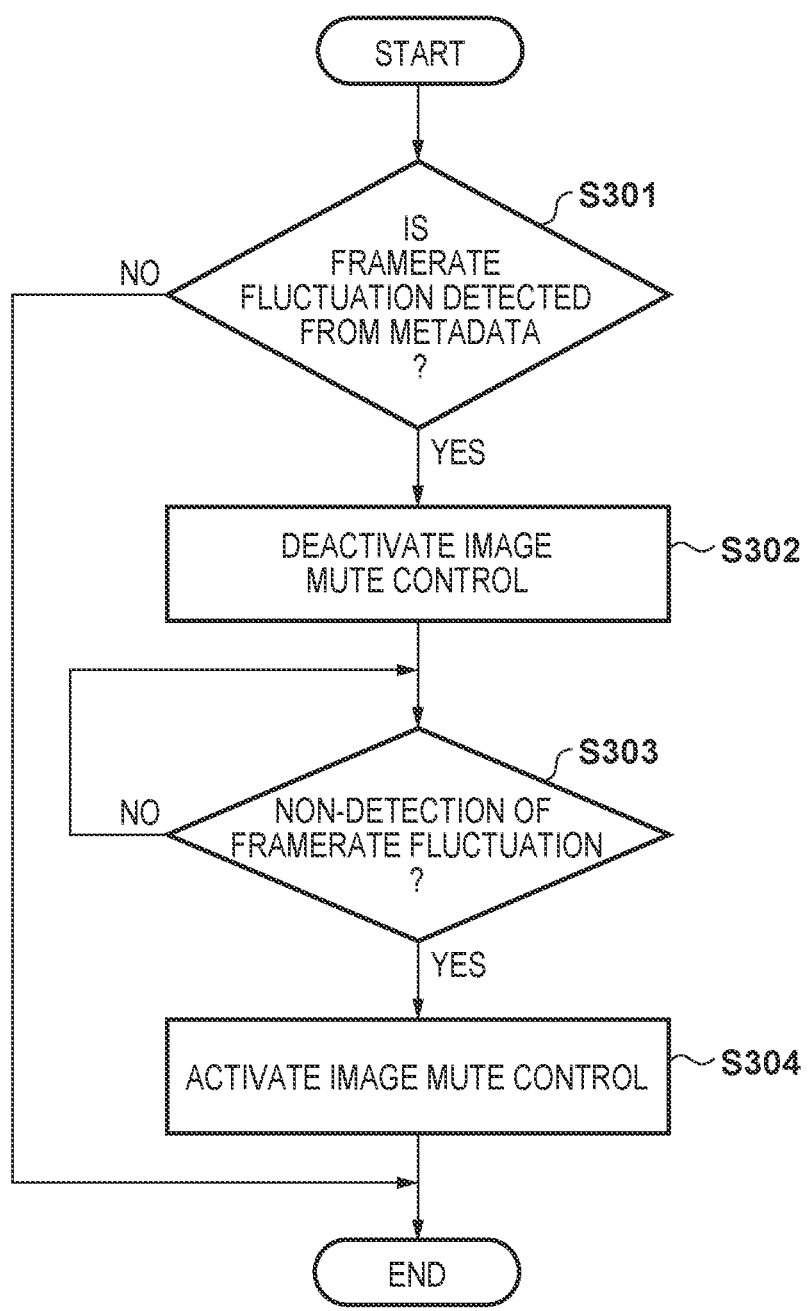
FIG. 6 is a flowchart illustrating image mute control processing according to a first embodiment.

FIG. 6 illustrates the operations of the projector 100 receiving an image signal from the PC 200 when the framerate of the image signal output from the PC 200 is changed. Note that the processing in FIG. 6 is realized by the control unit 101 of the projector 100 executing a program stored in the internal memory 115 and controlling each block.

In step S301, the image input unit 110 determines whether or not the framerate of the image signal received from the PC 200 is fluctuating. The image input unit 110 determines this by detecting a fluctuation in the framerate using at least one of the information items read from the metadata by the metadata acquiring unit 1102. In step S301, if the metadata acquiring unit 1102 detects a framerate fluctuation, a DET_FR_CHG_META signal is output to the image processor 116.

In step S301, if the metadata acquiring unit 1102 detects a fluctuation in the framerate, the process proceeds to step S302, and the image processor 116 receives the DET_FR_CHG_META signal and deactivates the image mute control. In such a case, the DET_FR_CHG_META signal is input to the image muting unit 1164, and the image muting unit 1164 deactivates the image mute control by the switching signal output from a shift register 1162 depending on the measurement result of the signal measuring unit 1161. In this way, even if the framerate of the image signal output from the PC 200 fluctuates, the image mute control activated by the signal measuring unit 1161 detecting fluctuation in framerate, i.e., the image mute control based on the signal measurement result, is suppressed. Note that, when a disturbance, such as disconnection of the HDMI cable, occurs while the image mute control is being suppressed, there is a possibility of a distorted image being displayed. Therefore, a separate device may be provided to detect the disconnection of a cable.

In step S303, the metadata acquiring unit 1102 enters a stand-by state for the next processing, while the metadata acquiring unit 1102 is detecting a framerate fluctuation.

If it is determined that the framerate fluctuation has stopped, i.e., a framerate fluctuation is not detected, the metadata acquiring unit 1102 stops the output of the DET_FR_CHG_META signal to the image processor 116, and the process proceeds to the step S304.

In step S304, the image muting unit 1164 of the image processor 116 activates the image mute control in response to the DET_FR_CHG_META signal being stopped, and the process ends.

Note that, if the metadata acquiring unit 1102 does not detect a fluctuation in the framerate in step S301, the process ends.

As described above, a fluctuation in the framerate is detected from the metadata superimposed on the image signal, and activation and deactivation of the image mute control is controlled depending on the detection result. In this way, impediment of display caused by unnecessary activation of the image mute control can be suppressed.

Second Embodiment

In the first embodiment, control in which the projector 100 switches the activation and deactivation of image muting based on the metadata superimposed on the image output from the PC 200 has been described.

In the second embodiment, control in which the activation and deactivation of image muting is switched based on the EDID sent from the projector 100 to the PC 200 will be described. The EDID contains information indicating the image display capability of the projector 100 and can be changed at the projector 100. Note that, although the EDID will be described as an example below, any piece of information may be used as long as the information indicates the image display capability of the projector 100.

In this embodiment, the configurations and the connection state of the projector 100 and the PC 200 are the same as those in the first embodiment.

Figure 7:
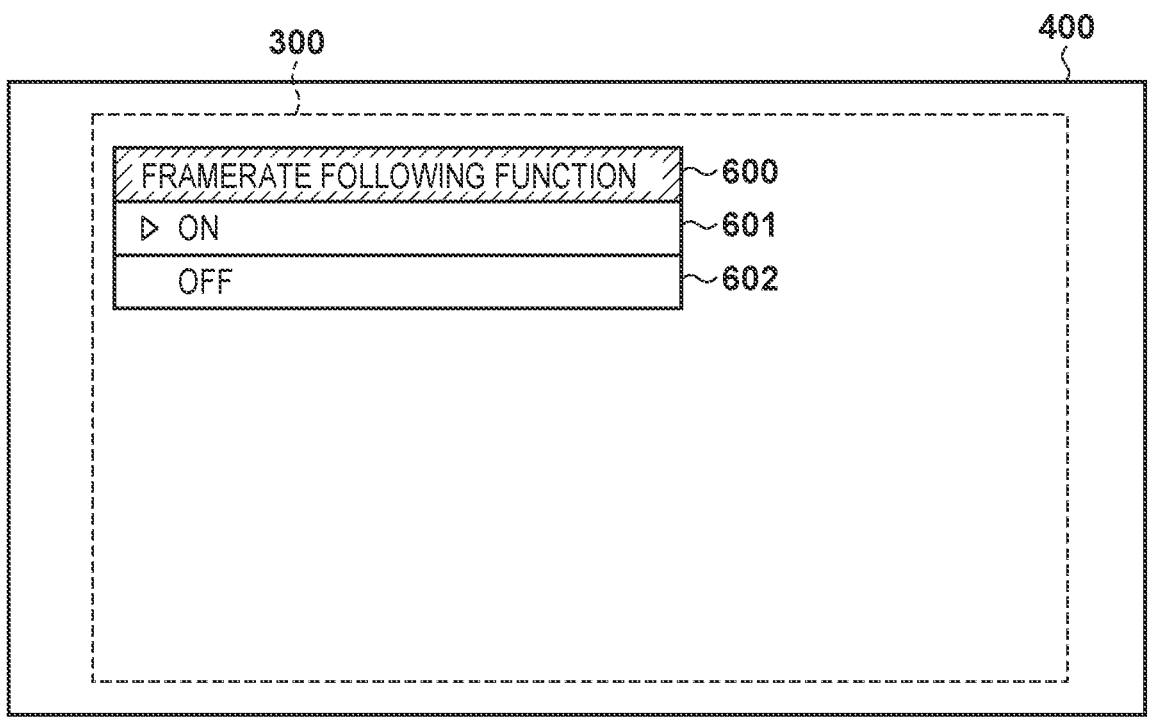
FIG. 7 is a diagram illustrating example OSDs for setting image display capability of the projector.

FIG. 7 illustrates a projection image 300 on which OSDs for setting the projector 100 are superimposed. An OSD 600 is an item for setting a framerate following function, and allows selection of whether or not to continue the display while following the fluctuation in the framerate of the image signal output from the PC 200. An OSD 601 is selected to turn on the framerate following function. An OSD 602 is selected to turn off the framerate following function. A setting of the projector 100 is changed in accordance with the information corresponding to the item selected for the OSD 600. The framerate following function is a function that allows the display to continue while following the fluctuation in the framerate of the image signal output from the PC 200. When the framerate following function is turned on, the image mute control is deactivated.

Figure 8:
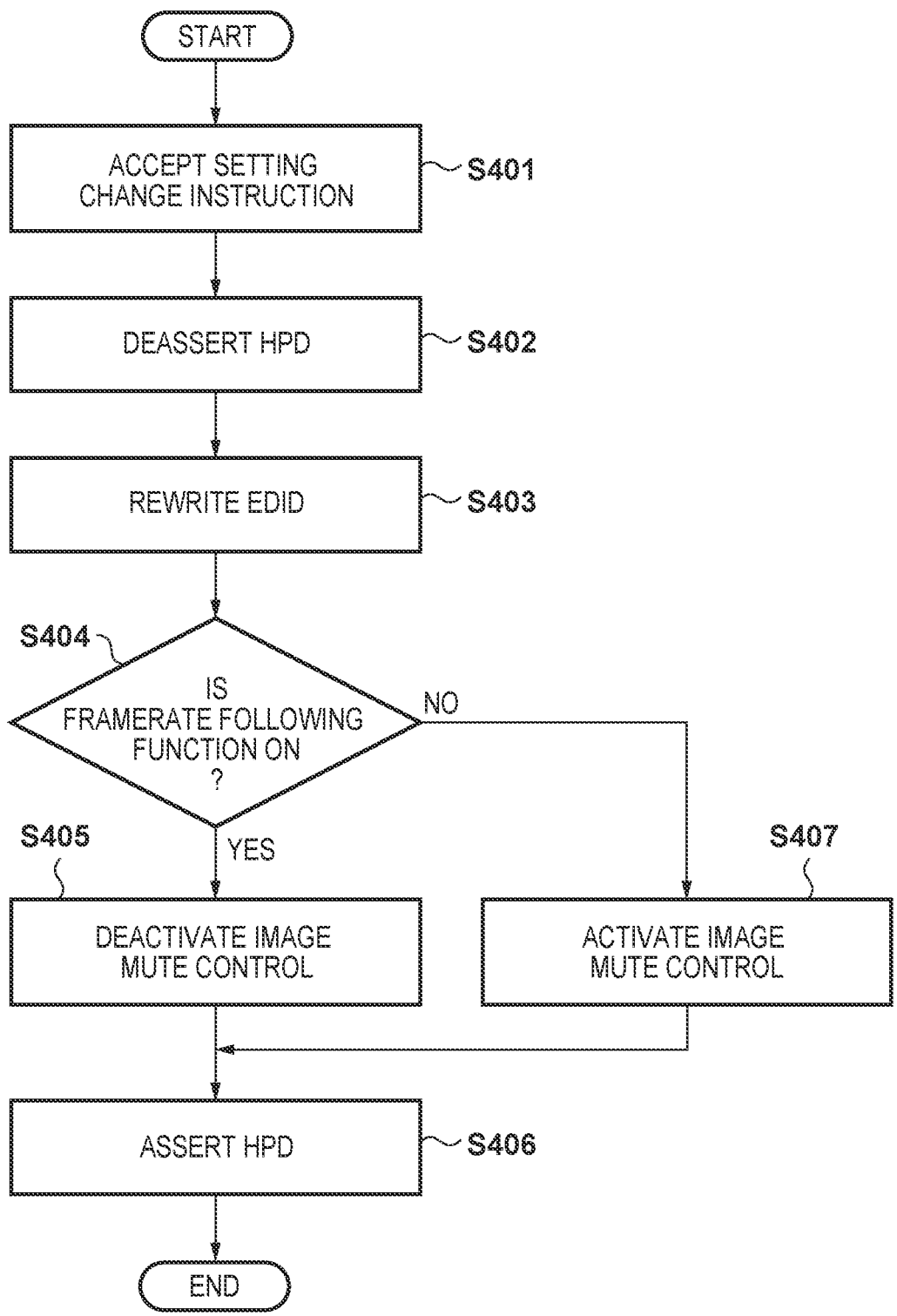
FIG. 8 is a flowchart illustrating image mute control processing according to a second embodiment.

The operations of the projector 100 after the setting of the framerate following function has been changed will now be described with reference to FIG. 8. The processing in FIG. 8 starts when the OSD 601 is selected to turn on the framerate following function or the OSD 602 is selected to turn off the framerate following function, according to a user operation made on the OSD 600 superimposed on the projection image 300 of the projector 100.

In step S401, the control unit 101 receives information corresponding to the item selected via the OSD 600.

In step S402, the control unit 101 sends an instruction to deassert the HPD of the image input unit 110 via the bus 133 so as to notify the PC 200 of information indicating the image display capability of the projector 100 corresponding to the setting changed in step S401, that is, to carry out the procedure of changing the EDID, and the HPD is deasserted by the PC 200.

In step S403, the control unit 101 rewrites the data in the EDID storage unit 111 via the bus 133 based on the information corresponding to the item selected via the OSD 600. The data content and the rewritten region in the EDID are to be based on various image protocols and image standards, such as HDMI and Video Electronics Standards Association (VESA).

In step S404, the control unit 101 determines whether or not the OSD 601 has been selected to turn on the framerate following function or the OSD 602 has been selected to turn off the framerate following function via the OSD 600. If the control unit 101 determines that the OSD 601 has been selected to turn on the framerate following function, the process proceeds to step S405 in which an instruction for the deactivation of the image mute control based on the signal measurement result is made to the image processor 116 via the bus 133.

When the image mute control of the image processor 116 is deactivated, the process proceeds to step S406 in which the control unit 101 instructs the image input unit 110 to assert the HPD via the bus 133 so as to prompt the operation of the PC 200 to read out the EDID and subsequently output an image signal.

In step S404, if the framerate following function is determined as being turned off, the process proceeds to step S407 in which the control unit 101 instructs the image processor 116 via the bus 133 to activate the image mute control based on the signal measurement result.

In step S406, the control unit 101 instructs the image input unit 110 to assert the HPD via the bus 133, reads out the EDID to the PC 200, and prompts the subsequent operations up to image signal output.

Note that, when image mute control is activated, the image muting unit 1164 changes the color of the image prior to the superimposition of the OSDs to a fixed color, such as black, and outputs the image to the following block.

As described above, by switching between the activation and deactivation of the image mute control in accordance with a change in the image display capability of the projector 100, i.e., a change in the EDID, impediment of the display caused by unnecessary image mute control can be suppressed.

Note that it is presumed that, after the image mute control has been deactivated in step S405, the supply of the image signal from the PC 200 is stopped, or the image format or resolution is changed.

To prevent distortion of the displayed image when such changes occur, the control unit 101 may, based on an instruction from the software, use the signal measuring unit 1161 to periodically monitor the presence or absence of a synchronization signal of the image signal, the signal timing of the synchronization signal, or the like, and when fluctuation or distortion is detected, additionally carry out processing such as performing image mute control and the like.

Alternatively, the dynamic switching control of the image mute control in accordance with the metadata in the first embodiment may be combined.

Third Embodiment

In the first and second embodiments, control in which the activation and deactivation of the image muting control is switched in accordance with the metadata superimposed on the image signal and settings by the OSDs was described.

In the third embodiment, control in which the activation and deactivation of image muting is switched based on a measurement result of the signal measuring unit 1161 of the projector 100 will be described.

In this embodiment, the configurations and the connection state of the projector 100 and the PC 200 are the same as those in the first embodiment.

Figure 9:
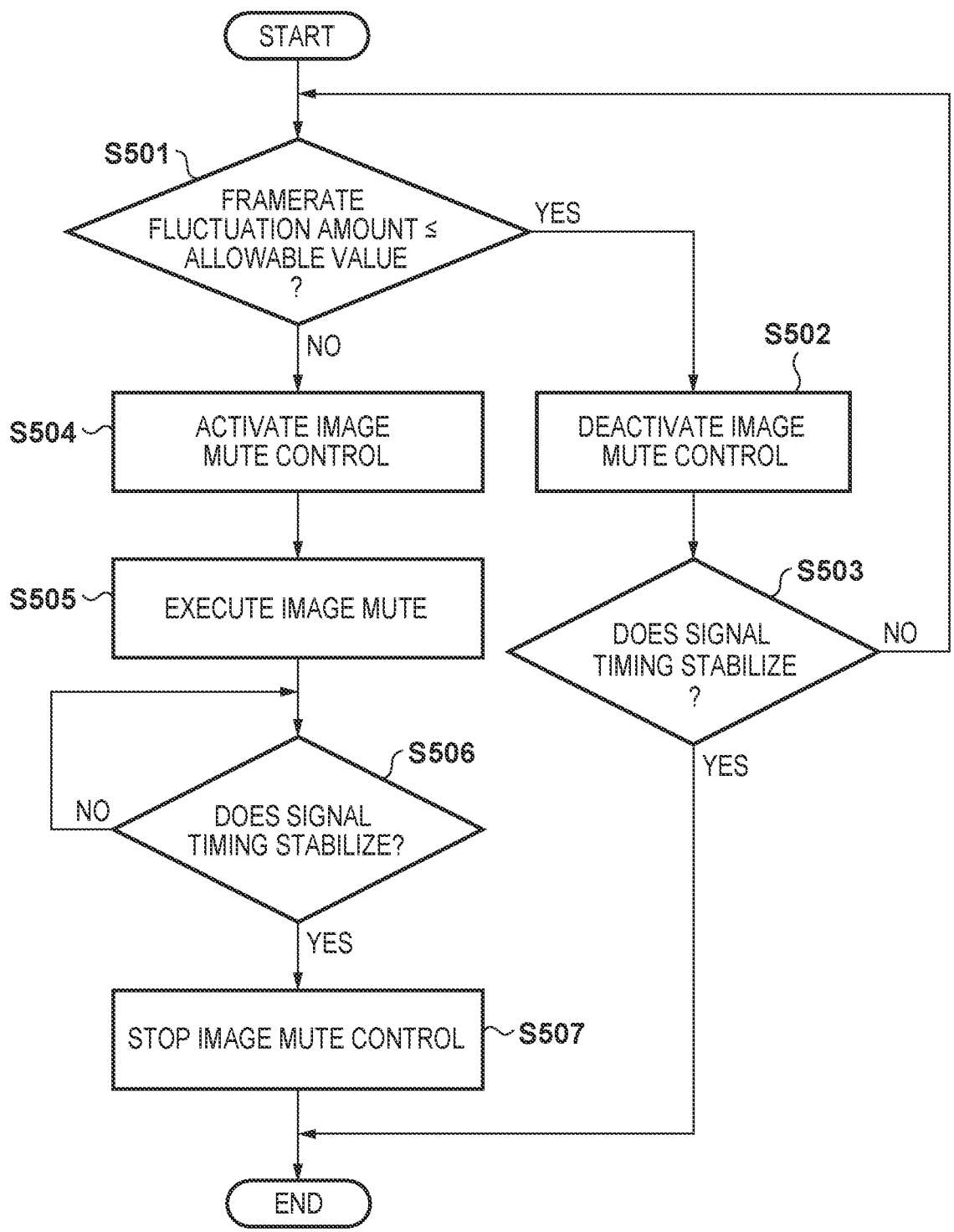
FIG. 9 is a flowchart illustrating image mute control processing according to a third embodiment.

The operations for when the framerate of the image signal output from the PC 200 fluctuates and the signal measuring unit 1105 of the projector 100 detects the fluctuation will be described with reference to FIG. 9. The operations correspond to the process in FIG. 4A described in the first embodiment.

In step S501, if a fluctuation in the framerate is detected, the signal measuring unit 1105 compares the fluctuation amount of the framerate of that at the time of reception of the last frame with a predetermined allowable value (threshold). The allowable value may be the fluctuation amount of the frequency of the horizontal synchronization signal or the vertical synchronization signal, or the like. For example, when the projector 100 is activated, the control unit 101 may write the fluctuation amount information in the register 1103 via the bus 133, and may compare the fluctuation amount of the frequency with the allowable value of the fluctuation amount information for determination. Note that it is desirable that the fluctuation amount indicating the allowable value be set within a range that does not cause impediment of the displayed image in consideration of limitations and operation modes of the internal system of the projector 100 or the signal timing after the image signal is divided in the internal system.

In step S501, if the framerate fluctuation amount is determined as being smaller than or equal to the allowable value, the signal measuring unit 1105 notifies the image processor 116 of the fact that the image mute control is unnecessary by deasserting or stopping the output of the DET_FR_CHG signal. That is, the image processor 116 is notified of the fact that the display can be continued without the display being distorted.

In step S502, in response to the notification, the image muting unit 1164 of the image processor 116 deactivates the image mute control.

In step S503, the signal measuring unit 1105 determines whether or not the signal timing of the image signal output from the PC 200 is stabilized, i.e., whether or not the fluctuation in the framerate is continuing. The signal measuring unit 1105 determines this by, for example, monitoring the synchronization signal or the like in each frame of the image signal.

In step S503, if it is determined that the framerate is fluctuating, the process returns to step S501, and the signal measuring unit 1105 determines the framerate fluctuation amount.

In step S503, if the signal measuring unit 1105 determines that the framerate is not fluctuating, the process ends.

In step S501, if it is determined that the framerate fluctuation amount is larger than the allowable value, the signal measuring unit 1105 notifies the image muting unit 1164 that image mute control is necessary by asserting or outputting the DET_FR_CHG signal. That is, the image muting unit 1164 is notified of the fact that image muting is necessary because there is a possibility of the display being distorted.

In step S504, in response to the notification, the image muting unit 1164 activates the image mute control.

When the image mute control is activated, the image muting unit 1164 detects a framerate fluctuation from the measurement result obtained by the signal measuring unit 1161 and executes the image mute control in step S505.

In step S506, the signal measuring unit 1161 determines whether or not the signal timing of the image signal output from the PC 200 is stabilized, i.e., whether or not a framerate fluctuation is continuing. The signal measuring unit 1161 determines this by, for example, monitoring the synchronization signal or the like in each frame of the image signal.

In step S506, if the signal measuring unit 1161 determines that the framerate is fluctuating, the process proceeds to step S507 in which the signal measuring unit 1161 sends an instruction to the image muting unit 1164 to cancel the image muting executed in step S505. The image muting is thereby canceled, and the process ends.

In step S506, if it is determined that the framerate is not fluctuating, the signal measuring unit 1161 continues the determination in step S506 and waits until the signal timing stabilizes.

As described above, by switching between activation and deactivation of the image mute control depending on the measurement result of the signal timing of the image signal, impediment of the display caused by unnecessary image mute control can be suppressed.

Note that in step S502 or S504, a signal for directly instructing image muting may be output, and in response, the image muting unit 1164 of the image processor 116 may immediately perform image muting.

Furthermore, the third embodiment may be combined with the first or second embodiment. In such a case, the switching of the image mute control depending on the framerate fluctuation amount in the third embodiment may be determined in addition to determining the switching of the image mute control depending on the metadata and the settings of the OSDs in the first and second embodiments.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-085796, filed Apr. 26, 2019 which is hereby incorporated by reference herein in its entirety.

What is claimed is:

1. A display apparatus comprising:
a memory and at least one processor and/or at least one circuit which function as:
 a receiving unit configured to receive an image signal;
 an image muting unit configured to execute a muting process on the image signal depending on a fluctuation in a framerate of the image signal;
 an acquiring unit configured to acquire information attached to the image signal;
 a measuring unit configured to measure the fluctuation in the framerate of the image signal based on a frequency of a horizontal synchronization signal of the image signal or a frequency of a vertical synchronization signal of the image signal; and
 a switching unit configured to determine whether or not the framerate of the image signal is fluctuating based on the information, and activate the image muting unit to execute the muting process, or deactivate the image muting unit from executing the muting process, depending on the determination result,
wherein the switching unit deactivates the image muting unit when the framerate of the image signal is determined to be fluctuating, and
wherein, when the image muting unit is not deactivated, the image muting unit executes the muting process in response to the fluctuation of the framerate of the image signal being measured by the measuring unit.

2. The apparatus according to claim 1, wherein the switching unit activates the image muting unit when the framerate of the image signal is determined to not be fluctuating.

3. The apparatus according to claim 1, wherein the information is metadata superimposed on the image signal.

4. The apparatus according to claim 1, wherein the at least one processor functions as
a superimposing unit configured to superimpose an on-screen display (OSD) on the image signal, and
wherein the image muting unit executes the muting process before processing is performed by the superimposing unit.

5. The apparatus according to claim 1, wherein the at least one processor functions as
a scaling unit configured to enlarge or reduce an image relative to the image signal, and
wherein the image muting unit executes the muting process after processing is performed by the scaling unit.

6. The apparatus according to claim 1, wherein the image signal is an image signal based on a protocol complying with an HDMI (trademark) standard.

7. A display apparatus which displays an image based on an image signal, comprising:
- a memory and at least one processor and/or at least one circuit which function as:
  - a receiving unit configured to receive the image signal;
  - an image muting unit configured to execute a muting process on the image signal depending on a fluctuation in a framerate of the image signal;
  - a holding unit configured to hold information indicating image display capability of the display apparatus in a rewritable manner; and
  - a switching unit configured to activate the image muting unit to execute the muting process, or deactivate the image muting unit from executing the muting process,
- wherein the switching unit deactivates the image muting unit when the information indicates that the display apparatus has image display capability corresponding to the fluctuation of the framerate of the image signal.

8. The apparatus according to claim 7, wherein the information is Extended Display Identification Data (EDID).

9. The apparatus according to claim 7, wherein the processor functions as
- a measuring unit configured to measure the fluctuation in the framerate of the image signal based on a frequency of a horizontal synchronization signal of the image signal or a frequency of a vertical synchronization signal of the image signal, and
- wherein, when the image muting unit is not deactivated, the image muting unit executes the muting process in response to the fluctuation of the framerate of the image signal being measured by the measuring unit.

10. The apparatus according to claim 9, wherein, when a fluctuation amount of the framerate of the image signal is determined to have exceeded a predetermined threshold, the switching unit activates the image muting unit.

11. The apparatus according to claim 7, wherein the information is Extended Display Identification Data (EDID).

12. The apparatus according to claim 7, wherein the at least one processor functions as
- a measuring unit configured to measure the fluctuation in the framerate of the image signal based on a frequency of a horizontal synchronization signal of the image signal or a frequency of a vertical synchronization signal of the image signal, and
- wherein, when the image muting unit is not deactivated, the image muting unit executes the muting process in response to the fluctuation of the framerate of the image signal being measured by the measuring unit.

13. The apparatus according to claim 12, wherein, when a fluctuation amount of the framerate of the image signal is determined to have exceeded a predetermined threshold, the switching unit activates the image muting unit.

14. The apparatus according to claim 7, wherein the at least one processor functions as
- a superimposing unit configured to superimpose an on-screen display (OSD) on the image signal, and
- wherein the image muting unit executes the muting process before processing is performed by the superimposing unit.

15. The apparatus according to claim 7, wherein the at least one processor functions as
- a scaling unit configured to enlarge or reduce an image relative to the image signal, and
- wherein the image muting unit executes the muting process after processing is performed by the scaling unit.

16. The apparatus according to claim 7, wherein the image signal is an image signal based on a protocol complying with an HDMI (trademark) standard.

17. A method of controlling a display apparatus which has a receiving unit configured to receive an image signal and an image muting unit configured to execute a muting process on the image signal depending on a fluctuation in a framerate of the image signal, the method comprising:
- receiving the image signal;
- acquiring information attached to the image signal;
- measuring the fluctuation in the framerate of the image signal based on a frequency of a horizontal synchronization signal of the image signal or a frequency of a vertical synchronization signal of the image signal;
- determining whether or not the framerate of the image signal is fluctuating based on the acquired information; and
- deactivating the image muting unit from executing the muting process when the framerate of the image signal is determined to be fluctuating; and
- when the image muting unit is not deactivated, causing the image muting unit to execute the muting process in response to the measured fluctuation of the framerate of the image signal.

18. A method of controlling a display apparatus configured to display an image based on an image signal, the display apparatus having a receiving unit configured to receive the image signal and an image muting unit configured to execute a muting process on the image signal depending on a fluctuation in a framerate of the image signal, the image muting unit being activated to execute the muting process, or deactivated from executing the muting process, depending on whether or not the display apparatus has image display capability corresponding to the fluctuation in the framerate of the image signal, the method comprising:
- receiving the image signal;
- holding information indicating image display capability of the display apparatus in a rewritable manner; and
- deactivating the image muting unit when the held information indicates that the display apparatus has image display capability corresponding to the fluctuation in the framerate of the image signal.

19. A non-transitory computer-readable storage medium storing a program that causes a computer to execute a method of controlling a display apparatus which has a receiving unit configured to receive an image signal and an image muting unit configured to execute a muting process on the image signal depending on a fluctuation in a framerate of the image signal, the method comprising:
- receiving the image signal;
- acquiring information attached to the image signal;
- measuring the fluctuation in the framerate of the image signal based on a frequency of a horizontal synchronization signal of the image signal or a frequency of a vertical synchronization signal of the image signal;
- determining whether or not the framerate of the image signal is fluctuating based on the acquired information; and
- deactivating the image muting unit from executing the muting process when the framerate of the image signal is determined to be fluctuating; and
- when the image muting unit is not deactivated, causing the image muting unit to execute the muting process in response to the measured fluctuation of the framerate of the image signal.

20. A non-transitory computer-readable storage medium storing a program that causes a computer to execute a method of controlling a display apparatus configured to display an image based on an image signal, the display apparatus having a receiving unit configured to receive the image signal and an image muting unit configured to execute a muting process on the image signal depending on a fluctuation in a framerate of the image signal, the image muting unit being activated to execute the muting process, or deactivated from executing the muting process, depending on whether or not the display apparatus has image display capability corresponding to the fluctuation in the framerate of the image signal, the method comprising:

receiving the image signal;

holding information indicating image display capability of the display apparatus in a rewritable manner; and deactivating the image muting unit when the held information indicates that the display apparatus has image display capability corresponding to the fluctuation in the framerate of the image signal.

* * * * *